US008823967B2

(12) United States Patent
Mamiya et al.

(10) Patent No.: US 8,823,967 B2
(45) Date of Patent: Sep. 2, 2014

(54) POWER-SUPPLY CONTROL DEVICE, IMAGE PROCESSING APPARATUS, POWER-SUPPLY CONTROL METHOD, AND COMPUTER READABLE MEDIUM

(75) Inventors: Mitsunobu Mamiya, Kanagawa (JP); Kazuhiko Narushima, Kanagawa (JP); Kouichi Azuma, Kanagawa (JP); Hidenori Horie, Kanagawa (JP); Masafumi Ono, Kanagawa (JP); Motofumi Baba, Kanagawa (JP); Masato Ishiyama, Kanagawa (JP); Keiko Shiraishi, Kanagawa (JP); Kenta Ogata, Kanagawa (JP); Kenji Kuroishi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 436 days.

(21) Appl. No.: 13/153,057

(22) Filed: Jun. 3, 2011

(65) Prior Publication Data
US 2012/0127538 A1 May 24, 2012

(30) Foreign Application Priority Data

Nov. 19, 2010 (JP) ................. 2010-259235

(51) Int. Cl.
*H04N 1/32* (2006.01)
*H02J 4/00* (2006.01)
*G06F 1/32* (2006.01)
*H04N 1/00* (2006.01)

(52) U.S. Cl.
CPC .......... *H04N 1/00891* (2013.01); *G06F 1/3231* (2013.01)
USPC ............ 358/1.14; 399/75; 713/310; 713/320; 340/565

(58) Field of Classification Search
USPC ................ 358/1.9, 1.14, 1.15, 296, 305, 442; 399/37, 75, 88; 713/310, 320, 323; 323/318; 340/522, 551, 561, 565, 567; 382/103
See application file for complete search history.

(56) References Cited

U.S. PATENT DOCUMENTS

| 5,189,393 | A | * | 2/1993 | Hu ................................ 340/522 |
| 5,822,077 | A | * | 10/1998 | Sasaki et al. .................. 358/296 |
| 7,260,730 | B2 | * | 8/2007 | Sakaue ........................ 713/310 |
| 8,325,037 | B2 | * | 12/2012 | Luemkemann et al. ...... 340/540 |
| 8,433,445 | B2 | * | 4/2013 | Busse et al. .................. 340/5.72 |
| 2001/0039627 | A1 | * | 11/2001 | Nishizawa .................... 713/320 |
| 2006/0066891 | A1 | * | 3/2006 | Ikeda et al. .................. 358/1.15 |
| 2007/0013550 | A1 | * | 1/2007 | Xie et al. ...................... 340/901 |

(Continued)

FOREIGN PATENT DOCUMENTS

JP 05-045471 A 2/1993

*Primary Examiner* — Kimberly A Williams
(74) *Attorney, Agent, or Firm* — Sughrue Mion, PLLC

(57) ABSTRACT

A power-supply control device includes a power-supply control section, a first detection section that detects whether or not a body capable of movement is moving, a second detection section that detects whether or not the body capable of movement exists, and an instruction section. The power-supply control section receives supply of power from a mains power source section, and selectively sets a power supply mode, in which power is supplied to a processing section, and a power saving mode, in which supply of power to the processing section is stopped. The first and second detection sections and the instruction section are caused to operate at least in the power saving mode. The instruction section provides, for the power-supply control section, an instruction for switching between the power supply mode and the power saving mode.

18 Claims, 9 Drawing Sheets

(56) References Cited

U.S. PATENT DOCUMENTS

| | | |
|---|---|---|
| 2009/0058791 A1* | 3/2009 | Lee et al. .................... 345/102 |
| 2009/0235098 A1* | 9/2009 | Matsunaga .................. 713/320 |
| 2009/0284465 A1* | 11/2009 | Oki et al. .................... 345/156 |
| 2009/0309904 A1* | 12/2009 | Shibasaki et al. ................ 347/1 |
| 2010/0207879 A1* | 8/2010 | Fadell et al. ................ 340/556 |
| 2010/0231390 A1* | 9/2010 | Hashimoto ................ 340/573.1 |
| 2010/0321711 A1* | 12/2010 | Takahashi .................... 358/1.9 |
| 2012/0146803 A1* | 6/2012 | Gear et al. ................ 340/686.6 |
| 2012/0296602 A1* | 11/2012 | Oyoshi ........................ 702/150 |
| 2013/0004023 A1* | 1/2013 | Takeuchi ..................... 382/103 |
| 2013/0057894 A1* | 3/2013 | Narushima et al. .......... 358/1.14 |
| 2014/0063528 A1* | 3/2014 | Hirose ........................ 358/1.13 |

\* cited by examiner

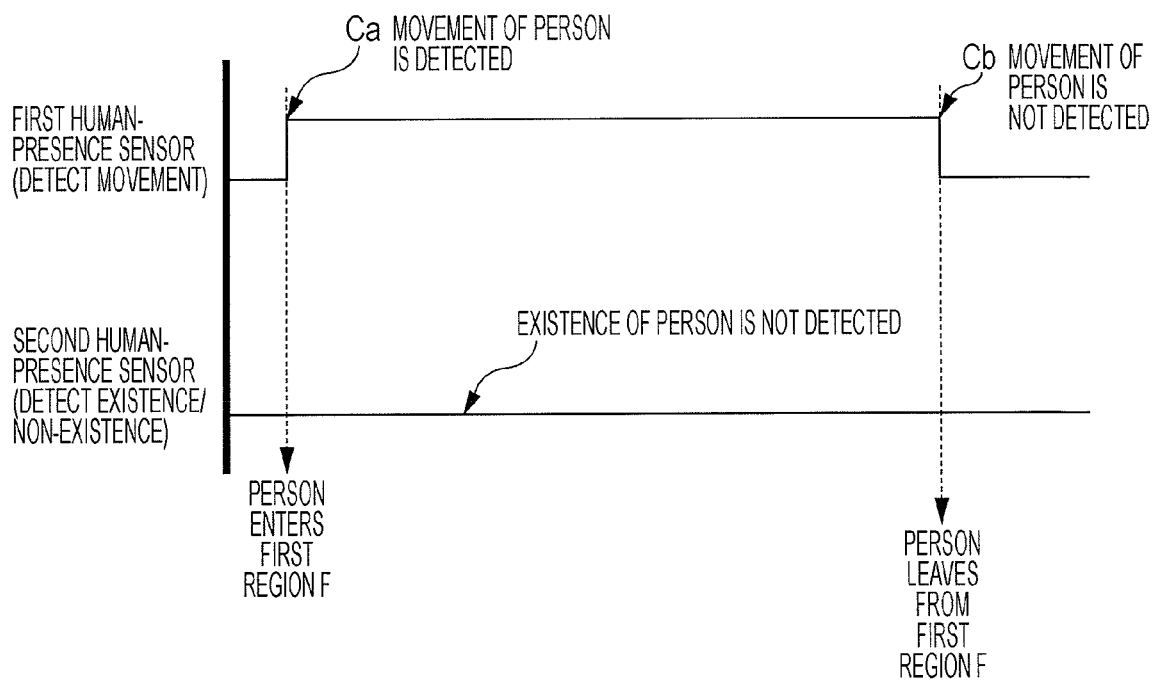

POWER-SUPPLY CONTROL DEVICE, IMAGE PROCESSING APPARATUS, POWER-SUPPLY CONTROL METHOD, AND COMPUTER READABLE MEDIUM

CROSS-REFERENCE TO RELATED APPLICATIONS

This application is based on and claims priority under 35 USC 119 from Japanese Patent Application No. 2010-259235 filed Nov. 19, 2010.

BACKGROUND (i) Technical Field

The present invention relates to a power-supply control device, an image processing apparatus, a power-supply control method, and a computer readable medium storing a program.

SUMMARY

According to an aspect of the invention, there is provided a power-supply control device including a power-supply control section, a first detection section, a second detection section, and an instruction section. The power-supply control section receives supply of power from a mains power source section, and selectively sets a power supply mode and a power saving mode. In the power supply mode, power is supplied to a processing section that operates using power supplied from the mains power source section. In the power saving mode, supply of power to the processing section is stopped. For the first detection section, a first region comparatively distant from the processing section is set as a detection target region. The first detection section is caused to operate by receiving supply of power at least in the power saving mode set by the power-supply control section, and detects whether or not a body capable of movement is moving. For the second detection section, a second region comparatively near the processing section is set as a detection target region. The second detection section is caused to operate by receiving supply of power at least in the power saving mode set by the power-supply control section, and detects whether or not the body capable of movement exists. The instruction section is caused to operate by receiving supply of power at least in the power saving mode set by the power-supply control section, and provides, for the power-supply control section, on the basis of results of detection performed by the first detection section and the second detection section, an instruction for switching between the power supply mode and the power saving mode.

BRIEF DESCRIPTION OF THE DRAWINGS

Exemplary embodiment(s) of the present invention will be described in detail based on the following figures, wherein:

FIG. 9 illustrates a timing diagram of a pattern C illustrated in FIG. 6, in which timing is illustrated using the detection signals output from the first human-presence sensor and the second human-presence sensor.

DETAILED DESCRIPTION

Figure 1:
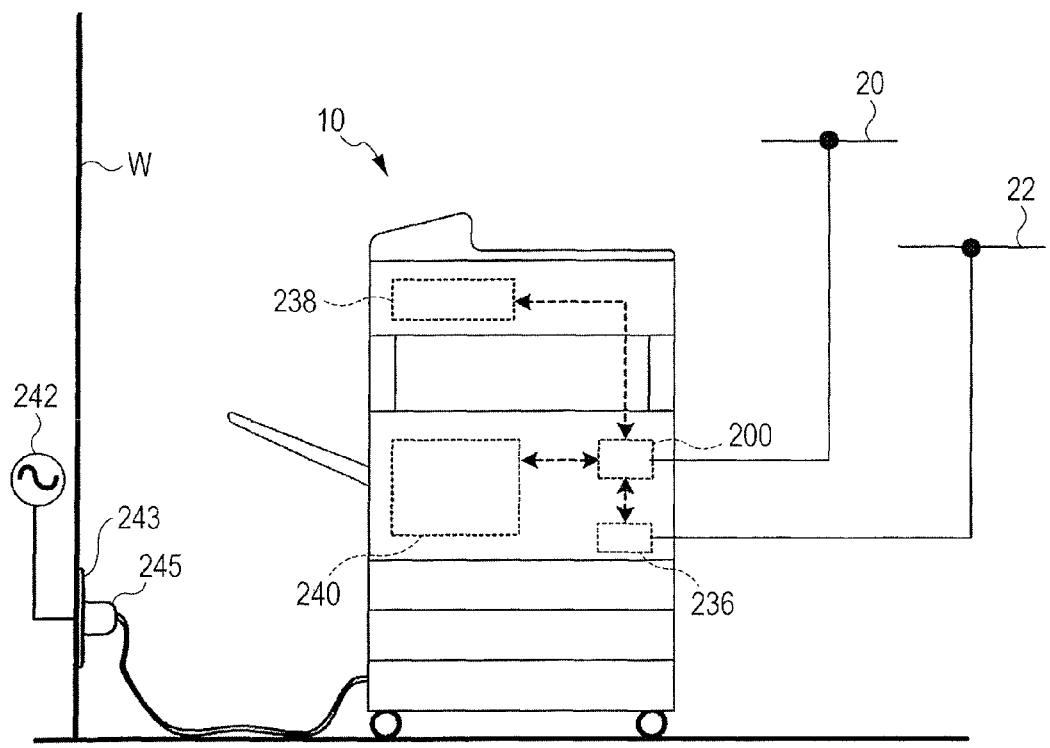
FIG. 1 is a schematic diagram of an image processing apparatus according to the present exemplary embodiment.

FIG. 1 illustrates an image processing apparatus 10 according to the present exemplary embodiment. The image processing apparatus 10 includes an image forming section 240 that forms an image on a recording sheet, an image reading section 238 that reads a document image, and a facsimile-communication control circuit 236. The image processing apparatus 10 includes a main controller 200. The main controller 200 controls the image forming section 240, the image reading section 238, and the facsimile-communication control circuit 236, thereby temporarily storing image data regarding a document image read by the image reading section 238 or transmitting the read image data to the image forming section 240 or to the facsimile-communication control circuit 236.

A network-communication network 20 such as the Internet is connected to the main controller 200. A telephone network 22 is connected to the facsimile-communication control circuit 236. The main controller 200 is connected to, for example, a host computer, via the network-communication network 20. The main controller 200 has a function of receiving image data and a function of performing facsimile reception and facsimile transmission using the telephone network 22 via the facsimile-communication control circuit 236.

The image forming section 240 includes a photoconductor drum. Around the photoconductor drum, a charging device, a scanning exposure unit, an image development unit, a transfer unit, and a cleaning unit are provided. The charging device uniformly charges the photoconductor drum. The scanning exposure unit scans the photoconductor using a light beam on the basis of image data. The image development unit develops an electrostatic latent image that has been formed by scanning the photoconductor drum with the scanning exposure unit so as to expose the photoconductor drum to the light beam. The transfer unit transfers, onto a recording sheet, an image that has been visualized on the photoconductor drum. The cleaning unit cleans the surface of the photoconductor drum after transfer is performed by the transfer unit. Furthermore, a fixing unit that fixes the image which has been transferred onto the recording sheet is provided along a path along which the recording sheet is transported.

In the image reading section 238, a document plate, a scanning drive system, and photoelectric conversion elements are provided. On the document plate, positioning of a document is performed. The scanning drive system scans an image formed on the document that is placed on the document plate, thereby irradiating the image with light. The photoelectric conversion elements, such as CCDs, receive reflected light or transmitted light, which are obtained by scanning the image with the scanning drive system, and convert the reflected light or transmitted light into electric signals.

Regarding the image processing apparatus 10, a plug 245 is also attached to an end of an input power line 244. The plug 245 is inserted in a plug plate 243 of a mains power source 242 for which installation of wires to a wall surface W is performed, thereby receiving supply of power.

Figure 2:
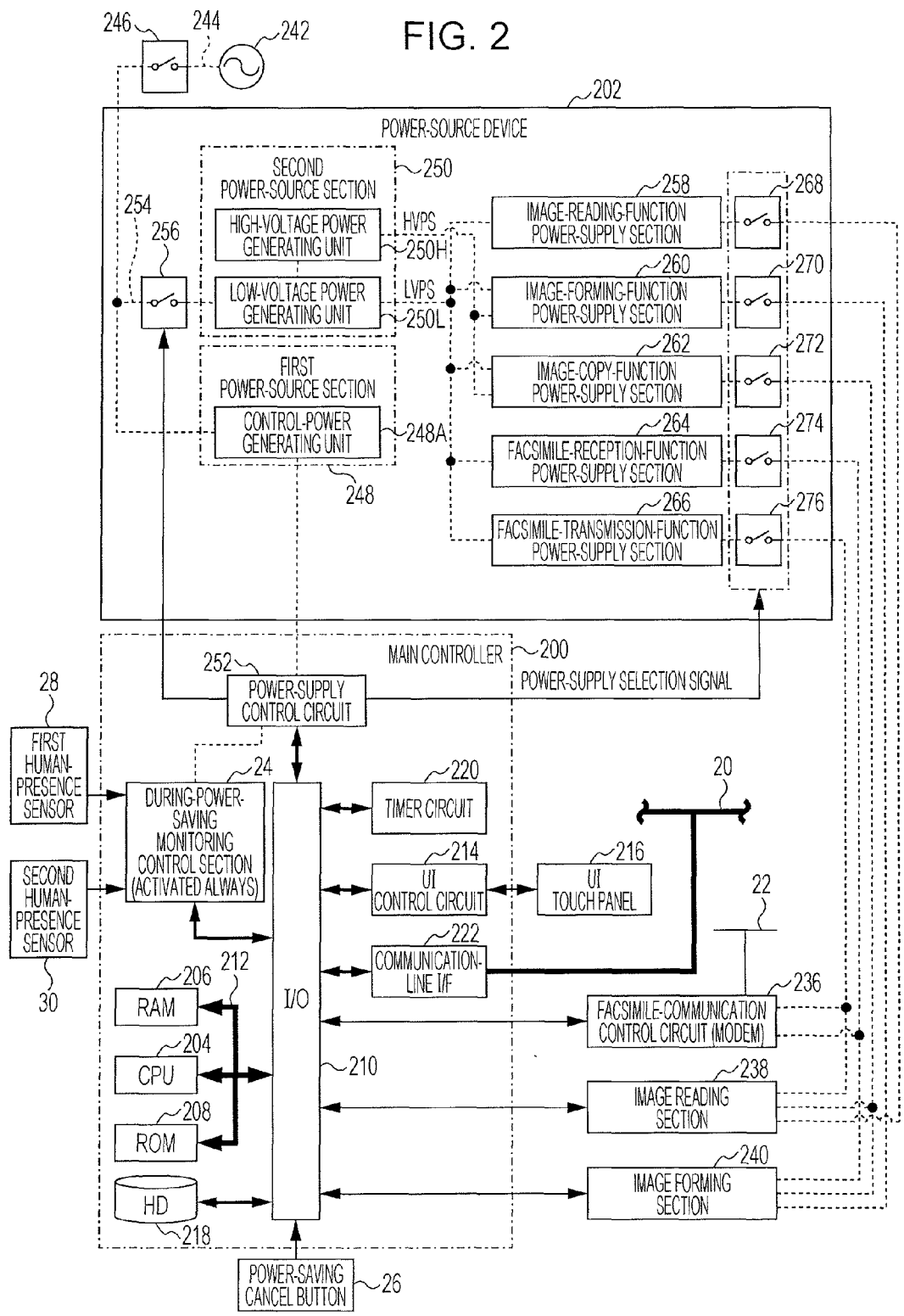
FIG. 2 is a diagram schematically illustrating a configuration of a main controller and a power-source device in the present exemplary embodiment.

FIG. 2 is a diagram schematically illustrating a configuration in which devices controlled by the main controller 200, the main controller 200, and power lines of a power-source device 202 used to supply power to the individual devices, and so forth are provided.

Main Controller 200

As illustrated in FIG. 2, the main controller 200 includes a central processing unit (CPU) 204, a random-access memory (RAM) 206, a read-only memory (ROM) 208, an input/output (I/O) (input/output section) 210, and a bus 212 including a data bus, a control bus, and so forth that are used to connect the CPU 204, the RAM 206, the ROM 208, the I/O 210 to each other. A user interface (UI) touch panel 216 is connected to the I/O 210 via a UI control circuit 214. Furthermore, a hard disk (HDD) 218 is connected to the I/O 210. The CPU 204 operates in accordance with a program recorded in the ROM 208, the hard disk 218, or the like, thereby realizing functions of the main controller 200. Note that the program may be installed from a recording medium (a compact disc read-only memory (CD-ROM), a digital versatile disk read-only memory (DVD-ROM), or the like) on which the program is stored, and the CPU 204 may operate in accordance with the program, whereby image processing functions may be realized.

A timer circuit 220 and a communication-line interface (I/F) 222 are connected to the I/O 210. Furthermore, the individual devices, which are the facsimile-communication control circuit (a modem) 236, the image reading section 238, and the image forming section 240, are connected to the I/O 210.

Note that, the timer circuit 220 counts an initial setting time as a trigger for setting the facsimile-communication control circuit 236, the image reading section 238, and the image forming section 240 to be in a power-saving state (a state in which power is not supplied).

Power is supplied from the power-source device 202 to the main controller 200 and the individual devices (the facsimile-communication control circuit 236, the image reading section 238, and the image forming section 240) (see dotted lines illustrated in FIG. 2). Note that, although one line (a dotted line) is illustrated as a power line in FIG. 2, the power line includes a few wiring lines in reality.

Power-Source Device 202

As illustrated in FIG. 2, the input power line 244, which is routed from the mains power source 242, is connected to a main switch 246. The main switch 246 is turned on, whereby supply of power to a first power-source section 248 and a second power-source section 250 becomes enabled.

The first power-source section 248 includes a control-power generating unit 248A. The control-power generating unit 248A is connected to a power-supply control circuit 252 of the main controller 200. The power-supply control circuit 252 supplies power to the main controller 200, and is connected to the I/O 210. The power-supply control circuit 252 performs, in accordance with a control program executed by the main controller 200, switching control for causing electricity to be conducted/not conducted through power-supply lines through which power is supplied to the individual devices (the facsimile-communication control circuit 236, the image reading section 238, and the image forming section 240).

In contrast, regarding a power line 254 that is to be connected to the second power-source section 250, a first sub-power-source switch 256 (hereinafter, referred to as a "SW-1" in some cases) is intervened between the power line 254 and the second power-source section 250. The SW-1 is controlled by the power-supply control circuit 252 so as to be turned on/off.

Furthermore, the second power-source section 250 includes a high-voltage power generating unit 250H and a low-voltage power generating unit (LVPS) 250L. The high-voltage power generating unit 250H is a power source that is used, for example, for a heater of the fixing unit of the image forming section 240 and so forth. Power for the high-voltage power generating unit 250H is generated by the low-voltage power generating unit 250L.

The high-voltage power generating unit 250H and the low-voltage power generating unit (LVPS) 250L of the second power-source section 250 are selectively connected to an image-reading-function power-supply section 258, an image-forming-function power-supply section 260, an image-copy-function power-supply section 262, a facsimile-reception-function power-supply section 264, and a facsimile-transmission-function power-supply section 266.

The image-reading-function power-supply section 258 uses the low-voltage power generating unit (LVPS) 250L as an input source, and is connected to the image reading section 238 via a second sub-power-source switch 268 (hereinafter, referred to as a "SW-2" in some cases).

The image-forming-function power-supply section 260 uses the high-voltage power generating unit 250H and the low-voltage power generating unit (LVPS) 250L as input sources, and is connected to the image forming section 240 via a third sub-power-source switch 270 (hereinafter, referred to as a "SW-3" in some cases).

The image-copy-function power-supply section 262 uses the high-voltage power generating unit 250H and the low-voltage power generating unit (LVPS) 250L as input sources, and is connected to the image reading section 238 and the image forming section 240 via a fourth sub-power-source switch 272 (hereinafter, referred to as a "SW-4" in some cases).

The facsimile-reception-function power-supply section 264 uses the high-voltage power generating unit 250H and the low-voltage power generating unit (LVPS) 250L as input sources, and is connected to the facsimile-communication control circuit 236 and the image forming section 240 via a fifth sub-power-source switch 274 (hereinafter, referred to as a "SW-5" in some cases).

The facsimile-transmission-function power-supply section 266 uses the low-voltage power generating unit (LVPS) 250L as an input source, and is connected to the facsimile-communication control circuit 236 and the image reading section 238 via a sixth sub-power-source switch 276 (hereinafter, referred to as a "SW-6" in some cases) (output of a communication report and so forth is excluded).

As in the case of the first sub-power-source switch 256, each of the second sub-power-source switch 268, the third sub-power-source switch 270, the fourth sub-power-source switch 272, the fifth sub-power-source switch 274, and the sixth sub-power-source switch 276 is controlled, in accordance with a power-supply selection signal supplied from the power-supply control circuit 252 of the main controller 200, so as to be turned on/off.

In the above-described configuration, the power sources connected so as to select the individual devices (the facsimile-communication control circuit 236, the image reading section 238, and the image forming section 240) on a function-by-function basis are provided, and power is not supplied to devices that are not necessary for a specified function. Accordingly, minimum necessary power is only necessary.

Monitoring During Power Saving Mode

Here, regarding the main controller 200 in the present exemplary embodiment, in some cases, the functions thereof are partially stopped in order to consume minimum necessary power. Alternatively, in some cases, supply of power to elements including most sections of the main controller 200 is stopped. Such cases are collectively referred to a "power saving mode". A during-power-saving monitoring control section 24 is provided as an element that always receives supply of power during the power saving mode, and is connected to the I/O 210. The during-power-saving monitoring control section 24 may be configured using, for example, an integrated circuit (IC) chip, which is referred to as an "application-specific integrated circuit (ASIC)", in which an operation program is stored, and which includes a CPU, a RAM, a ROM, and so forth that are processed in accordance with the operation program.

When monitoring during the power saving mode is performed, it is supposed that, for example, an operation is performed on the UI touch panel 216 or an operation is performed on so-called hard keys (for example, operation buttons for providing a copy instruction, a facsimile instruction, and so forth), and, in accordance with the operation, the during-power-saving monitoring control section 24 controls the first sub-power-source switch 256, the second sub-power-source switch 268, the third sub-power-source switch 270, the fourth sub-power-source switch 272, the fifth sub-power-source switch 274, and the sixth sub-power-source switch 276, thereby supplying power to devices that have been set in the power saving mode.

Furthermore, a power-saving cancel button 26 is connected to the I/O 210 of the main controller 200. A user performs an operation on the power-saving cancel button 26 during the power saving mode, whereby power saving can be cancelled.

Here, in order to monitor an operation performed on the UI touch panel 216 or an operation performed on the so-called hard keys (including the power-saving cancel button 26), which are described above, it is supposed that power is supplied to the UI touch panel 216 of the main controller 200 and so forth in addition to the during-power-saving monitoring control section 24.

Accordingly, in reality, even during the power saving mode, minimum necessary power that is, for example, necessary for input systems including the UI touch panel 216 is supplied.

Furthermore, when a user stands in front of the image processing apparatus 10, and, then, performs an operation on the power-saving cancel button 26, thereby resuming supply of power, there are some cases in which it takes time until the image processing apparatus 10 becomes activated.

For this reason, in the present exemplary embodiment, for reduction of the amount of power supplied to the main controller 200 by monitoring during the above-described power saving mode, in order to further reduce the amount of power supplied to the main controller 200, two types of human-presence sensors (a first human-presence sensor 28 and a second human-presence sensor 30) having specifications different from each other are provided in the during-power-saving monitoring control section 24. In the power saving mode, supply of power to sections excluding the first human-presence sensor 28, the second human-presence sensor 30, and the during-power-saving monitoring control section 24 is interrupted.

Note that, regarding the first human-presence sensor 28 and the second human-presence sensor 30, the term "human presence" is used. However, the term "human presence sensor" is a proper noun used in accordance with the present exemplary embodiment. The human-presence sensor at least needs to detect a person. In other words, the human-presence sensor may also detect a body capable of movement other than a person. Accordingly, in the description give below, there are some cases in which a target to be detected by the human-presence sensor is a "person". However, in the future, a robot or the like that performs an operation instead of a person may be included in examples of a target to be detected by the human-presence sensor. Note that, in contrast, when a specific sensor capable of exclusively detecting a person exists, the specific sensor may be applied.

Regarding the first human-presence sensor 28, it is supposed that, in the periphery of the image processing apparatus 10, the first human-presence sensor 28 has, as a detection region (hereinafter, referred to as a "first region F"), a region larger than the detection region of the second human-presence sensor 30, which is described below. For example, the detection region of the first human-presence sensor 28 ranges about 2 m to about 3 m (see the first region F (far) illustrated in FIG. 6), although depending on the environment of a place in which the image processing apparatus 10 is disposed.

In contrast, it is supposed that the second human-presence sensor 30 has, as a detection region (hereinafter, referred to as a "second region N"), a region smaller than the detection region (the first region F) of the first human-presence sensor 28, which is described above. For example, the detection region of the second human-presence sensor 30 ranges so that a user can perform an operation on the UI touch panel 216 or the hard keys of the image processing apparatus 10, and ranges from about 0 m to about 0.5 m (see the second region N (near) illustrated in FIG. 6).

The specification of the first human-presence sensor 28 includes detection of movement of a person. The first human-presence sensor 28 is typified by, for example, an infrared ray sensor using a pyroelectric effect of a pyroelectric element.

The most distinctive feature of the first human-presence sensor 28 is that the detection region thereof is large (the detection region ranges from about 2 m to about 3 m or may range from 2 m or less to 3 m or more). Furthermore, because the first human-presence sensor 28 detects movement of a person, when a person is standing still in the detection region, the first human-presence sensor 28 does not detect the existence of the person. For example, supposing that a high-level signal is output when a person moves, when the person becomes still in the detection region, the signal changes from the high-level signal to a low-level signal.

As a matter of course, the meaning of the term "still" in the present exemplary embodiment also includes a state in which a person is completely still, as in a still image captured by a still camera or the like. However, for example, the meaning of the term "still" also includes a state in which a person is standing still in front of the image processing apparatus 10 for the sake of performing an operation. Accordingly, the meaning of the term "still" includes a state in which a person slightly moves in a range that is determined in advance or a state in which a person moves a hand, a leg, the neck, or the like.

Note that it is not necessarily necessary to use a scheme in which the sensitivity of the first human-presence sensor 28 is adjusted after the meaning of the term "still" is defined as described above. The sensitivity of the first human-presence sensor 28 may be comparatively roughly and typically adjusted, and may depend on the detection state of the first human-presence sensor 28. In other words, when the first human-presence sensor 28 outputs one of binary signals (for example, a high-level signal), it may be indicated that a person is moving. When a person exists in the detection region of the first human-presence sensor 28 and the other signal of the binary signals (for example, a low-level signal) is output, it may be indicated that the person is standing still.

The specification of the second human-presence sensor 30 includes detection of presence/non-presence (existence/non-existence) of a person. The second human-presence sensor 30 is typified by, for example, a reflection-type sensor including a light-projecting unit and a light-receiving unit. Note that a configuration in which the light-projecting unit and the light-receiving unit are separated from each other may be used.

The most distinctive feature of the second human-presence sensor 30 is that the second human-presence sensor 30 reliably detects presence/non-presence of a person in accordance with whether or not light that is to enter the light-receiving unit is interrupted. Furthermore, because the amount of light entering the light-receiving unit is limited by the amount of light projected from the light-projecting unit or the like, the detection region of the second human-presence sensor 30 is a comparatively short region (the detection region ranges from about 0 m to about 0.5 m as described above).

Here, the first human-presence sensor 28 and the second human-presence sensor 30, which are mounted in the image processing apparatus 10 according to the present exemplary embodiment, are connected to the during-power-saving monitoring control section 24 as described above. Detection signals from the first human-presence sensor 28 and the second human-presence sensor 30 are input to the during-power-saving monitoring control section 24.

The during-power-saving monitoring control section 24 makes distinctions among the following three situations on the basis of the detection signals output from the first human-presence sensor 28 and the second human-presence sensor 30.

(First Situation)

A person approaches, for the sake of using the image processing apparatus 10, a position at which the person can perform an operation on the image processing apparatus 10.

Figure 6:
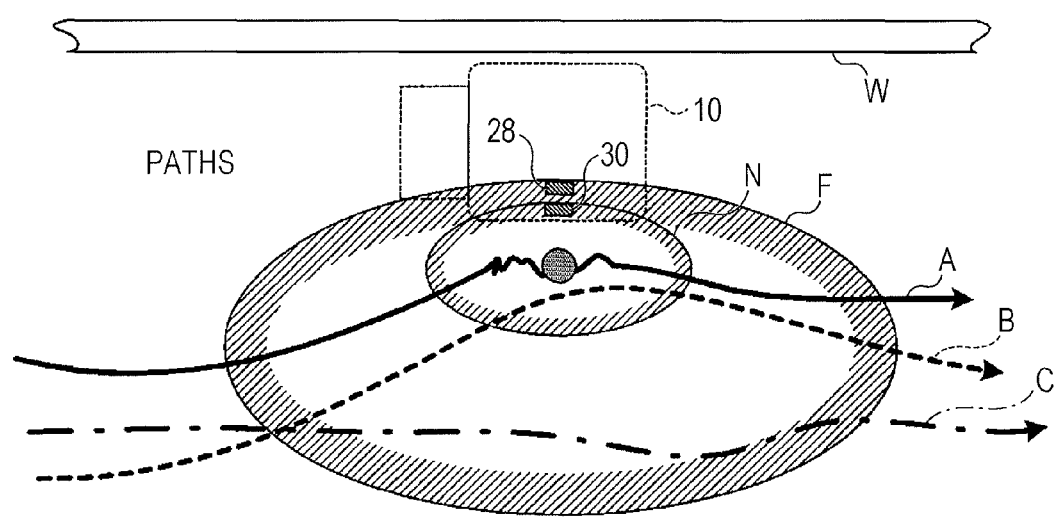
FIG. 6 is a plan view of the image processing apparatus and the periphery thereof, which illustrates an example in the present exemplary embodiment.

The distinction between the first situation and the other situations can be made by establishing the following flow: first, it is detected by the first human-presence sensor 28 that a person has entered the first region F; after that, it is detected by the second human-presence sensor 30 that the person has entered the second region N while the person is being continuously detected by the first human-presence sensor 28; and, then, the person (standing still) in the second region N is not detected by the first human-presence sensor 28 (see movement (a pattern A) indicated by the arrow A illustrated in FIG. 6).

(Second Situation)

A person approaches, not for the sake of using the image processing apparatus 10, a position at which the person can perform an operation on the image processing apparatus 10.

The distinction between the second situation and the other situations can be made by establishing the following flow: first, it is detected by the first human-presence sensor 28 that a person has entered the first region F; after that, it is detected by the second human-presence sensor 30 that the person has entered the second region N while the person is being continuously detected by the first human-presence sensor 28; the person leaves the second region N (the person is not detected by the second human-presence sensor 30) while (the movement of) the person in the second region N is being continuously detected by the first human-presence sensor 28; and, furthermore, the person leaves the first region F (the person is not detected by the first human-presence sensor 28) (see movement (a pattern B) indicated by the arrow B illustrated in FIG. 6).

(Third Situation)

Although a person does not approach a position at which the person can perform an operation on the image processing apparatus 10, the person reaches a certain position so that the situation may change from the third situation to the first or second situation.

The distinction between the third situation and the other situations can be made by establishing the following flow: first, it is detected by the first human-presence sensor 28 that a person has entered the first region F; and, after that, the person leaves the first region F (the person is not detected by the first human-presence sensor 28) while the person is not being detected by the second human-presence sensor 30 (see movement (a pattern C) indicated by the arrow C illustrated in FIG. 6).

The during-power-saving monitoring control section 24 determines the three types of situations, which are described above, on the basis of the detection signals of the first human-presence sensor 28 and the second human-presence sensor 30. First, the during-power-saving monitoring control section 24 supplies, on the basis of determination of the three types of situations, power to the input systems including the UI touch panel 216 and the hard keys that are connected to the main controller 200, the hard keys including the power-saving cancel button 26 and being used to provide instructions for execution of copy and so forth.

After that, an operation is performed on the UI touch panel 216, the hard keys, or the like to specify a function, whereby the during-power-saving monitoring control section 24 supplies power to devices that are necessary for the function specified using the operation. In a case in which an operation is performed on the power-saving cancel button 26, power is simultaneously supplied to all of the devices. Note that, although power is supplied to all devices that are necessary for a specified function in the present exemplary embodiment, power may be supplied to all of the devices regardless of a specified function.

Figure 3:
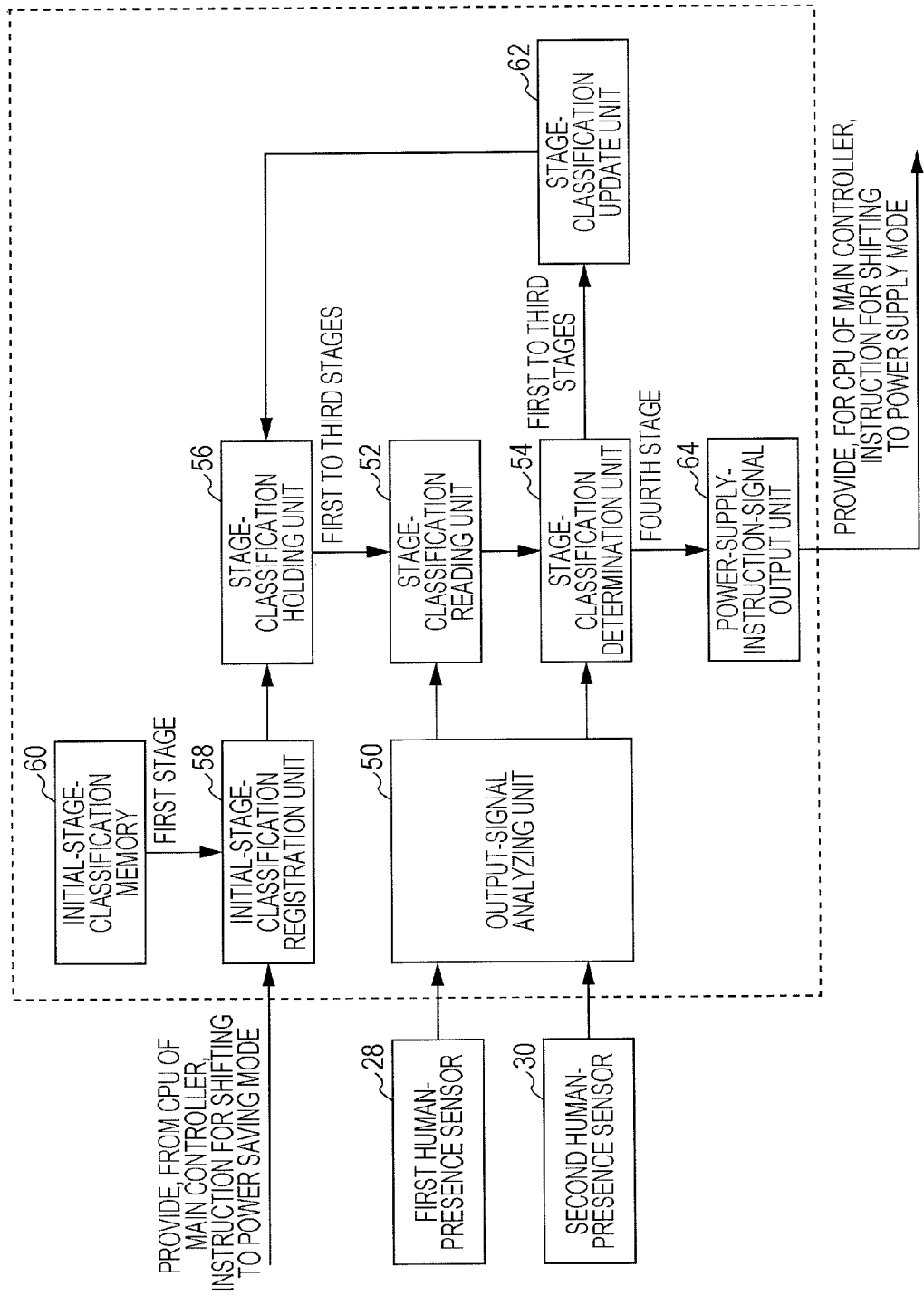
FIG. 3 is a functional block diagram illustrating a flow of control, which is performed in a during-power-saving monitoring control section, for monitoring a state in which a person approaches the image processing apparatus during a power saving mode in the present exemplary embodiment.

FIG. 3 is a functional block diagram illustrating a flow of control, which is performed in the during-power-saving monitoring control section 24, for monitoring a state in which a person approaches the image processing apparatus 10 during the power saving mode. Note that FIG. 3 functionally illustrates the control for monitoring a state in which a person approaches the image processing apparatus 10, and does not limit a hardware configuration.

The first human-presence sensor 28 and the second human-presence sensor 30 are individually connected to an output-signal analyzing unit 50. The output-signal analyzing unit 50 analyses the detection signals, which have been input from the first human-presence sensor 28 and the second human-presence sensor 30, so that times at which the detection signals are detected and so forth are associated with each other, thereby obtaining analytical results. The output-signal analyzing unit 50 transmits the analytical results one by one to a stage-classification reading unit 52 and a stage-classification determination unit 54.

A stage-classification holding unit 56 is connected to the stage-classification reading unit 52. The stage-classification reading unit 52 reads a present stage classification (among first to third stages) that is held in the stage-classification holding unit 56, and transmits the present stage classification to the stage-classification determination unit 54.

The stage-classification holding unit 56 is connected to an initial-stage-classification registration unit 58. An instruction signal representing an instruction for shifting to the power saving mode is input from the CPU 204 of the main controller 200 to the initial-stage-classification registration unit 58. When the instruction signal representing an instruction for shifting to the power saving mode is input, the initial-stage-classification registration unit 58 reads an initial stage (here, the first stage) that is held in the initial-stage-classification memory 60, and registers the initial stage in the stage-classification holding unit 56.

The stage-classification determination unit 54 determines a new stage classification on the basis of the analytical results that have been obtained by analyzing the detection signals output from the first human-presence sensor 28 and the second human-presence sensor 30 with the output-signal analyzing unit 50, and on the basis of the present stage classification that has been received from the stage-classification reading unit 52.

A stage-classification update unit 62 and a power-supply-instruction-signal output unit 64 are connected to the stage-classification determination unit 54.

As a result of determination performed by the stage-classification determination unit 54, when it is determined that a new stage classification is one of the first to third stages, the stage-classification determination unit 54 outputs the new stage classification, which is one of the first to third stages, to the stage-classification update unit 62. The stage-classification update unit 62 is connected to the stage-classification holding unit 56. As a result, the stage-classification update unit 62 performs an update process so that the new stage classification which has been received is held in the stage-classification holding unit 56.

In contrast, as a result of determination performed by the stage-classification determination unit 54, when it is determined that the new stage classification is a fourth stage, the stage-classification determination unit 54 outputs the fourth stage to the power-supply-instruction-signal output unit 64. The power-supply-instruction-signal output unit 64 outputs, to the CPU 204 of the main controller 200, an instruction for shifting to the power supply mode.

Actions in the present exemplary embodiment will be described below.

In the image processing apparatus 10 in the present exemplary embodiment, when conditions determined in advance are satisfied, shifting to the power saving mode is performed. In the power saving mode, not only supply of power to the individual devices, which are the facsimile-communication control circuit 236, the image reading section 238, and the image forming section 240, is interrupted, but also supply of power to the main controller 200 excluding the during-power-saving monitoring control section 24, and the UI touch panel 216 is interrupted. In this case, the function of the power-saving cancel button 26 connected to the main controller 200 is also stopped. Accordingly, the image processing apparatus 10 enters a state that is equivalent to a state in which a main power switch is completely turned off when the image processing apparatus 10 is viewed from the surroundings thereof. In other words, the image processing apparatus 10 enters a state in which, by viewing from the surroundings thereof, it can be made sure that the power saving mode is assuredly set (realization of "visualization").

Here, in the present exemplary embodiment, for a trigger for resuming supply of power to the image processing apparatus 10 that is set in the power saving mode as described above, the surroundings of the image processing apparatus 10 are monitored by the first human-presence sensor 28 and the second human-presence sensor 30 (hereinafter, simply referred to as the "first" and the "second" in some cases in FIG. 5). Whether a person is approaching the image processing apparatus 10 for the sake of performing an operation or not for the sake of performing an operation is distinguished, and whether or not supply of power is to be resumed is determined.

Figure 4:
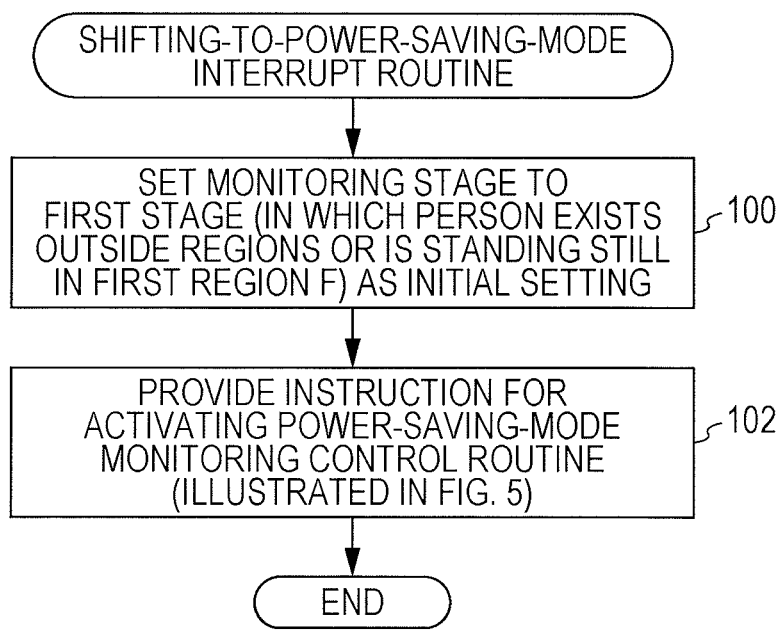
FIG. 4 is a control flow diagram illustrating a shifting-to-power-saving-mode interrupt routine in a case of shifting to the power saving mode in the present exemplary embodiment.
Figure 5:
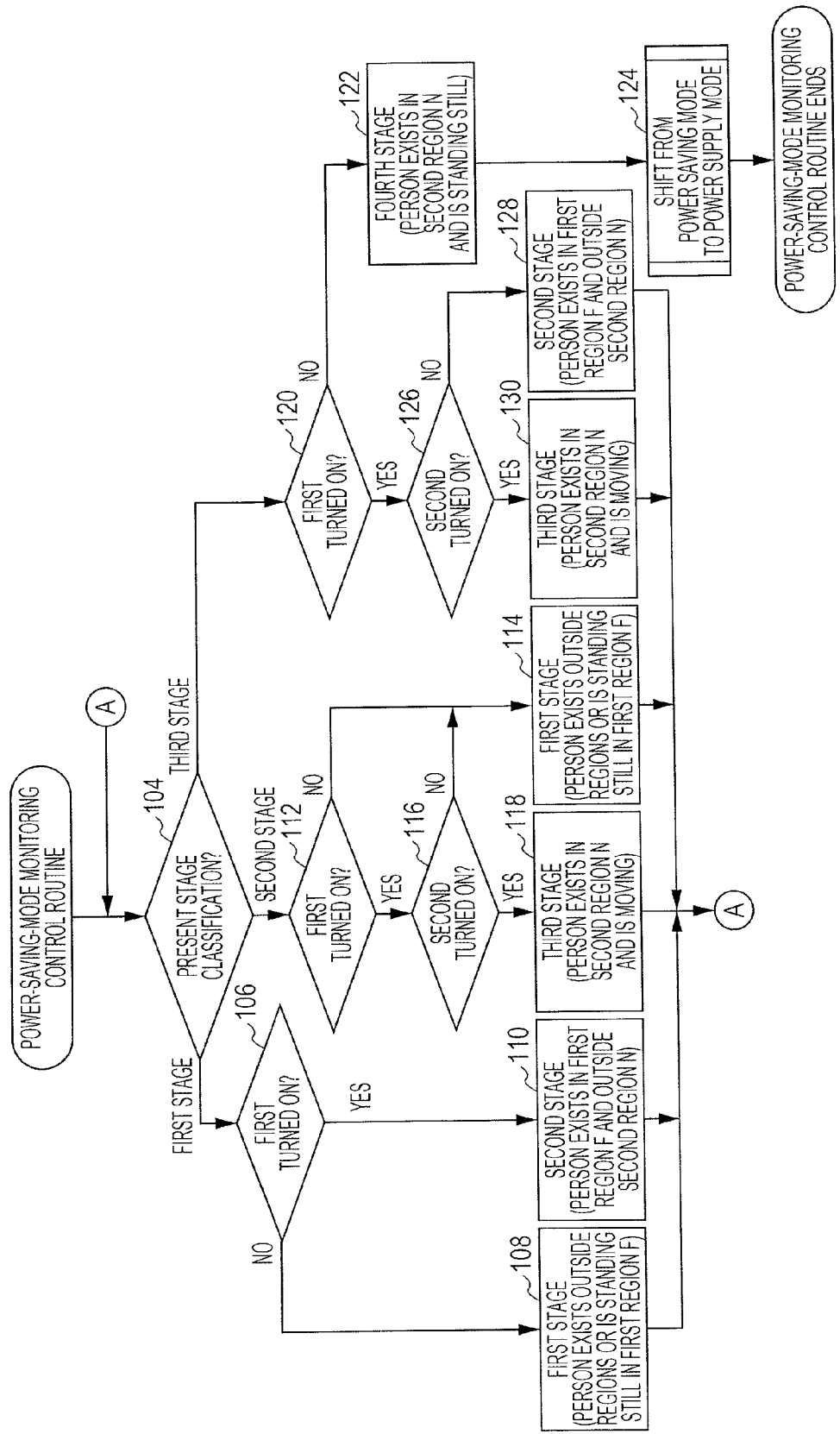
FIG. 5 is a control flow diagram illustrating a power-saving-mode monitoring control routine in the present exemplary embodiment.

FIGS. 4 and 5 are flow diagrams illustrating routines for controlling the power saving mode.

First, referring to FIG. 4, when the image processing apparatus 10 shifts to the power saving mode, a shifting-to-power-saving-mode interrupt routine is executed. In step 100, a human-presence-sensor monitoring stage, which is described below, is set to the "first stage". Next, the process proceeds to step 102, an instruction for activating a power-saving-mode monitoring control routine illustrated in FIG. 5 is provided, and the shifting-to-power-saving-mode interrupt routine finishes.

FIG. 5 is a flow diagram illustrating the power-saving-mode monitoring control routine.

In step 104, the present stage classification is determined. Note that the four stages, i.e., the first to fourth stages, are set as stage classifications that are used for determination in the flow diagram illustrated in FIG. 5.

The first stage illustrates a state in which a person exists outside the first region F (see FIG. 6) or in which a person is standing still in the first region F (excluding the second region N (see FIG. 6)).

The second stage indicates a state in which a person exists in the first region F but has not reached the second region N, and in which the person is moving.

The third stage indicates a state in which a person is moving in the second region N.

The fourth stage indicates a state in which a person is standing still in the second region N.

Note that, at a point in time when the power-saving-mode monitoring control routine illustrated in FIG. 5 is activated, the first stage is registered as a stage classification. Accordingly, it is determined in step 104 that the present stage classification is the first stage.

(First Stage)

When it is determined in step 104 that the present stage classification is the first stage, the process proceeds to step 106, and whether or not the first human-presence sensor 28 is turned on (whether or not the high-level signal is output) is determined. When a result of determination in step 106 is NO, i.e., when the first human-presence sensor 28 is turned off (the low-level signal is output), the process proceeds to step 108, and the present stage classification is set (updated) to be the first stage. The process returns to step 104.

Furthermore, when a result of determination in step 106 is YES, i.e., when the first human-presence sensor 28 is turned on, the process proceeds to step 110, and the present stage classification is set (updated) to be the second stage. The process returns to step 104.

(Second Stage)

When the present stage classification is the second stage in step 104, the process proceeds to step 112, and whether or not the first human-presence sensor 28 is turned on is determined. When a result of determination in step 112 is NO, i.e., when the first human-presence sensor 28 is turned off, the process proceeds to step 114, and the present stage classification is set (updated) to be the first stage. The process returns to step 104.

Furthermore, when a result of determination in step 112 is YES, i.e., when the first human-presence sensor 28 is turned on, the process proceeds to step 116, and whether or not the second human-presence sensor 30 is turned on is determined. When a result of determination in step 116 is NO, i.e., when the second human-presence sensor 30 is turned off, the process proceeds to step 114, and the present stage classification is set (updated) to be the first stage. The process returns to step 104.

Moreover, when a result of determination in step 116 is YES, i.e., when the second human-presence sensor 30 is turned on, the process proceeds to step 118, and the present stage classification is set (updated) to be the third stage. The process returns to step 104.

(Third Stage)

When it is determined in step 104 that the present stage classification is the third stage, the process proceeds to step 120, and whether or not the first human-presence sensor 28 is turned on is determined. When a result of determination in step 120 is NO, i.e., when the first human-presence sensor 28 is turned off, the process proceeds to step 122, and the present stage classification is set to be the fourth stage.

(Fourth Stage)

The fourth stages indicates a state in which a person is standing still in front of the image processing apparatus 10. Accordingly, in other words, it is supposed that a person is close to the image processing apparatus 10 and is standing still for the sake of performing an operation on the image processing apparatus 10. The process proceeds from step 122 to step 124. The CPU 204 of the main controller 200 is instructed to shift from the power saving mode to the power supply mode. The power-saving-mode monitoring control routine finishes.

When the main controller 200 is instructed to shift to the power supply mode, the main controller 200 at least activates the functions (which includes a backlight) of the UI touch panel 216, and enables an operation that is to be performed on the hard keys including the power-saving cancel button 26. The main controller 200 causes the image processing apparatus 10 to enter a state in which the image processing apparatus 10 waits for an operation performed by a user.

As a result, when a user performs, for example, an operation for copying on the UI touch panel 216 or the like that receives minimum necessary power, power is supplied to the image reading section 238 and the image forming section 240.

As illustrated in FIG. 5, when a result of determination in step 120 is YES, i.e., when the first human-presence sensor 28 is turned on, the process proceeds to step 126, and whether or not the second human-presence sensor 30 is turned on is determined. When a result of determination in step 126 is NO, i.e., when the second human-presence sensor 30 is turned off, the process proceeds to step 128, and the present stage classification is set (updated) to be the second stage. The process returns to step 104.

Furthermore, when a result of determination in step 126 is YES, i.e., when the second human-presence sensor 30 is turned on, the process proceeds to step 130, and the present stage classification is set (updated) to be the third stage. The process returns to step 104.

Examples

FIGS. 6 to 9 illustrate specific examples in which determination of whether a person is approaching the image processing apparatus 10 for the sake of using the image processing apparatus 10 or not for the sake of using the image processing apparatus 10 is performed in the present exemplary embodiment.

FIG. 6 is a plan view of the image processing apparatus 10 and the periphery thereof. The first region F and the second region N are set at positions distant from the image processing apparatus 10 that is placed along the wall surface W.

Here, in FIG. 6, patterns A to C are illustrated as patterns, which are broadly classified, of movement of a person in a state in which the image processing apparatus 10 is disposed as described above.

The pattern A indicates a movement path along which a person approaches a position at which the person can perform an operation on the image processing apparatus 10, along which the person becomes still to perform an operation for the sake of using the image processing apparatus 10, and along which the person moves away from the image processing apparatus 10. The position of the person who moves along the movement path sequentially changes as follows: outside the regions (the first stage); in the first region F (the second stage); in the second region N (the third stage, and, further, when the person becomes still, it is determined that the present stage classification is the fourth stage, so that the power saving mode is cancelled); in the first region F (the second stage); and outside the regions (the first stage).

The pattern B indicates a movement path along which a person approaches a position at which the person can perform an operation on the image processing apparatus 10, and along which the person passes by the image processing apparatus 10. The position of the person who moves along the movement path sequentially changes as follows: outside the regions (the first stage); the first region F (the second stage); the second region N (the third stage (the person continues moving)); the first region F (the second stage); and outside the regions (the first stage).

The pattern C indicates a movement path along which a person passes through the vicinity of the image processing apparatus 10 without approaching a position at which the person can perform an operation on the image processing apparatus 10. The position of the person who moves along the movement path sequentially changes as follows: outside the regions (the first stage); the first region F (the second stage); and outside the regions (the first stage).

(Pattern A)

Figure 7:
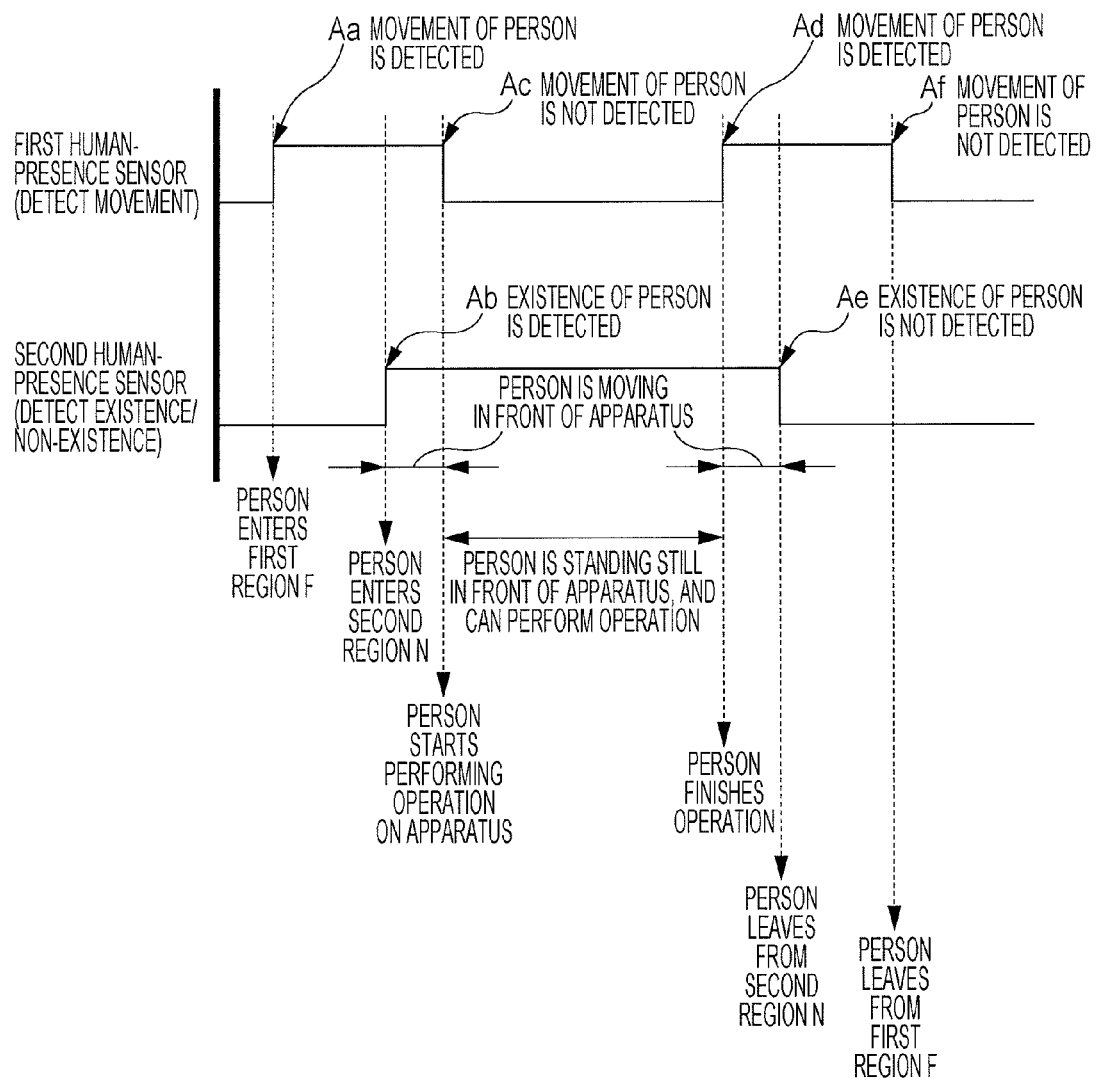
FIG. 7 illustrates a timing diagram of a pattern A illustrated in FIG. 6, in which timing is illustrated using detection signals output from a first human-presence sensor and a second human-presence sensor.

FIG. 7 illustrates a timing diagram of the pattern A, in which timing is illustrated using the detection signals output from the first human-presence sensor 28 and the second human-presence sensor 30.

First, movement of a person is detected by the first human-presence sensor 28 (see Aa illustrated in FIG. 7). While the movement of the person is being continuously detected, the existence of the person is detected by the second human-presence sensor 30 (see Ab illustrated in FIG. 7).

At this point in time, the person only exists in front of the image processing apparatus 10, and whether the person exists in front of the image processing apparatus 10 for the sake of performing an operation or for the sake of passing by the image processing apparatus 10 is unknown.

Next, while the existence of the person is being detected by the second human-presence sensor 30, the movement of the person is no longer detected by the first human-presence sensor 28 (see Ac illustrated in FIG. 7). This state indicates that the person suddenly stands still. It is determined that the person intends to perform an operation on the image processing apparatus 10, and the power saving mode is cancelled.

When the person moves away from the image processing apparatus 10, first, movement of the person is detected by the first human-presence sensor 28 while the existence of the person is being detected by the second human-presence sensor 30 (see Ad illustrated in FIG. 7). Next, the existence of the person is no longer detected by the second human-presence sensor 30 (see Ae illustrated in FIG. 7). Finally, the movement of the person is no longer detected by the first human-presence sensor 28 (see Af illustrated in FIG. 7), thereby recognizing that the person has moved away from the image processing apparatus 10 (has moved away to a position farther than the first region F).

Note that, in the present exemplary embodiment, determination of a state in which the person moves away from the image processing apparatus 10 is not necessarily necessary.

(Pattern B)

Figure 8:
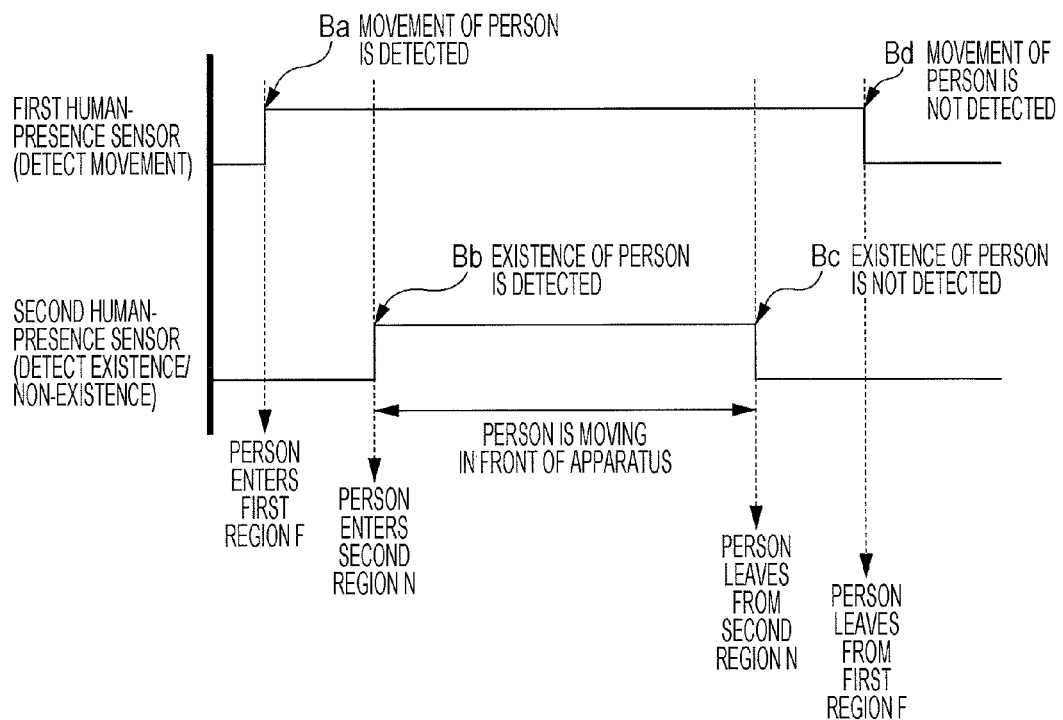
FIG. 8 illustrates a timing diagram of a pattern B illustrated in FIG. 6, in which timing is illustrated using the detection signals output from the first human-presence sensor and the second human-presence sensor.

FIG. 8 illustrates a timing diagram of the pattern B, in which timing is illustrated using the detection signals output from the first human-presence sensor 28 and the second human-presence sensor 30.

First, movement of a person is detected by the first human-presence sensor 28 (see Ba illustrated in FIG. 8). While the movement of the person is being detected, the existence of the person is detected by the second human-presence sensor 30 (see Bb illustrated in FIG. 8).

At this point in time, the person only exists in front of the image processing apparatus 10, and whether the person exists in front of the image processing apparatus 10 for the sake of performing an operation or for the sake of passing by the image processing apparatus 10 is unknown.

Next, while the movement of the person is being continuously detected by the first human-presence sensor 28, the existence of the person is no longer detected by the second human-presence sensor 30 (see Bc illustrated in FIG. 8). Finally, the movement of the person is no longer detected by the first human-presence sensor 28 (see Bd illustrated in FIG. 8), thereby recognizing that the person has moved away from the image processing apparatus 10 (has moved away to a position farther than the first region F).

(Pattern C)

FIG. 9 illustrates a timing diagram of the pattern C, in which timing is illustrated using the detection signals output from the first human-presence sensor 28 and the second human-presence sensor 30.

First, movement of a person is detected by the first human-presence sensor 28 (see Ca illustrated in FIG. 9). While the movement of the person is being detected, the existence of the person is not detected by the second human-presence sensor 30. The movement of the person is no longer detected by the first human-presence sensor 28 (see Cb illustrated in FIG. 9), thereby recognizing that the person has moved away from the image processing apparatus 10 (has moved away to a position farther than the first region F).

Note that, in the present exemplary embodiment, power during the power saving mode (power utilized to activate the during-power-saving monitoring control section 24) is supplied from the mains power source 242. However, if the during-power-saving monitoring control section 24 operates using power supplied from an internal battery, a solar cell, or a rechargeable battery that is charged during the power supply mode, supply of power from the mains power source 242 is completely interrupted in the power saving mode.

Furthermore, referring to FIG. 2, a configuration is used, in which power is supplied on a device-by-device basis to devices (the facsimile-communication control circuit 236, the image reading section 238, the image forming section 240, and a portion of the main controller 200, the UI touch panel 216, and so forth) that are necessary for each processing function which is specified, or supply of power to the devices is interrupted on a device-by-device basis. However, for example, a configuration may be used, in which power is supplied to all of the devices in the power supply mode, and in which, in contrast, power can be supplied to only at least the first human-presence sensor 28, the second human-presence sensor 30, and a monitoring control system therefor (the during-power-saving monitoring control section 24) in the power saving mode.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A method comprising: selectively switching an image processing apparatus between a first power mode and a second power mode in response to results received from a first detector which detects movement or non-movement of a target near the image processing apparatus and a second detector, separate from the first detector, which detects presence of the target near the image processing apparatus, wherein the first detector and the second detector are different types of detectors, wherein the first detector is an infrared ray sensor which uses a pyroelectric effect and the second detector is a reflection-type sensor including a light-projecting unit and a light-receiving unit.

2. The method of claim 1, wherein if the results indicate that the first detector detects non-movement of the target and the second detector detects presence of the target, the selectively switching comprises switching the image processing apparatus from the second power mode to the first power mode.

3. The method of claim 2, wherein the selectively switching comprises switching the image processing apparatus from the second power mode to the first power mode in response to receiving the results indicating that the first detector detects non-movement of the target after detecting movement of the target and the second detector detects presence of the target.

4. The method of claim 1, wherein power is supplied to the image processing apparatus in the first power mode and power is not supplied to the image processing apparatus in the second power mode.

5. The method of claim 1, wherein the first detector detects movement or non-movement of the target in a first region near the image processing apparatus, the first region covering a first range with respect to a periphery of the image processing apparatus, and wherein the second detector detects presence of the target in a second region near the image processing apparatus, the second region covering a second range, different from the first range, with respect to the periphery of the image processing apparatus.

6. The method of claim 1, wherein the image processing apparatus performs one or more of an image reading function, an image forming function, and a facsimile-communication control function.

7. An apparatus comprising: one or more processors configured to selectively switch an image processing apparatus between a first power mode and a second power mode in response to results received from a first detector which detects movement or non-movement of a target near the image processing apparatus and a second detector, separate from the first detector, which detects presence of the target near the image processing apparatus, wherein the first detector and the second detector are different types of detectors, wherein the first detector is an infrared ray sensor which uses a pyroelectric effect and the second detector is a reflection-type sensor including a light-projecting unit and a light-receiving unit.

8. The apparatus of claim 7, wherein if the results indicate that the first detector detects non-movement of the target and the second detector detects presence of the target, the one or more processors switch the image processing apparatus from the second power mode to the first power mode.

9. The apparatus of claim 8, wherein the one or more processors switch the image processing apparatus from the second power mode to the first power mode in response to receiving the results indicating that the first detector detects non-movement of the target after detecting movement of the target and the second detector detects presence of the target.

10. The apparatus of claim 7, wherein power is supplied to the image processing apparatus in the first power mode and power is not supplied to the image processing apparatus in the second power mode.

11. The apparatus of claim 7, wherein the first detector detects movement or non-movement of the target in a first region near the image processing apparatus, the first region covering a first range with respect to a periphery of the image processing apparatus, and wherein the second detector detects presence of the target in a second region near the image processing apparatus, the second region covering a second range, different from the first range, with respect to the periphery of the image processing apparatus.

12. The apparatus of claim 7, wherein the image processing apparatus comprises at least one of an image reading section, an image forming section, and a facsimile-communication control section.

13. A non-transitory computer readable medium storing a program for executing control functions, the control functions comprising: selectively switching an image processing apparatus between a first power mode and a second power mode in response to results received from a first detector which detects movement or non-movement of a target near the image processing apparatus and a second detector, separate from the first detector, which detects presence of the target near the image processing apparatus, wherein the first detector and the second detector are different types of detectors, wherein the first detector is an infrared ray sensor which uses a pyroelectric effect and the second detector is a reflection-type sensor including a light-projecting unit and a light-receiving unit.

14. The non-transitory computer readable medium of claim 13, wherein if the results indicate that the first detector detects non-movement of the target and the second detector detects presence of the target, the selectively switching comprises switching the image processing apparatus from the second power mode to the first power mode.

15. The non-transitory computer readable medium of claim 14, wherein the selectively switching comprises switching the image processing apparatus from the second power mode to the first power mode in response to receiving the results indicating that the first detector detects non-movement of the target after detecting movement of the target and the second detector detects presence of the target.

16. The non-transitory computer readable medium of claim 13, wherein power is supplied to the image processing apparatus in the first power mode and power is not supplied to the image processing apparatus in the second power mode.

17. The non-transitory computer readable medium of claim 13, wherein the first detector detects movement or non-movement of the target in a first region near the image processing apparatus, the first region covering a first range with respect to a periphery of the image processing apparatus, and wherein the second detector detects presence of the target in a second region near the image processing apparatus, the second region covering a second range, different from the first range, with respect to the periphery of the image processing apparatus.

18. The non-transitory computer readable medium of claim 13, wherein the image processing apparatus performs one or more of an image reading function, an image forming function, and a facsimile-communication control function.

* * * * *